(12) United States Patent
Chu et al.

(10) Patent No.: US 8,667,601 B2
(45) Date of Patent: Mar. 4, 2014

(54) METHOD AND DEVICE FOR UPGRADING RIGHTS OBJECT THAT WAS STORED IN MEMORY CARD

(75) Inventors: Younsung Chu, Gyeonggi-Do (KR); Seungjae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 13/319,708

(22) PCT Filed: Jun. 17, 2010

(86) PCT No.: PCT/KR2010/003922
§ 371 (c)(1),
(2), (4) Date: Nov. 10, 2011

(87) PCT Pub. No.: WO2010/147410
PCT Pub. Date: Dec. 23, 2010

(65) Prior Publication Data
US 2012/0060225 A1    Mar. 8, 2012

Related U.S. Application Data

(60) Provisional application No. 61/218,051, filed on Jun. 17, 2009, provisional application No. 61/262,114, filed on Nov. 17, 2009.

(30) Foreign Application Priority Data

Apr. 1, 2010  (KR) ........................ 10-2010-0030121

(51) Int. Cl.
*G06F 17/30* (2006.01)
(52) U.S. Cl.
USPC ............................................ 726/26; 713/193

(58) Field of Classification Search
USPC .......................... 726/26–30, 31–33; 713/193; 705/50–52, 57; 380/200–201
See application file for complete search history.

(56) References Cited

U.S. PATENT DOCUMENTS

| 8,032,941 | B2 * | 10/2011 | Jung et al. ........................ 726/27 |
| 8,336,109 | B2 * | 12/2012 | Zhang et al. ..................... 726/30 |
| 2006/0031164 | A1 * | 2/2006 | Kim ................................. 705/51 |
| 2006/0059094 | A1 * | 3/2006 | Oh et al. .......................... 705/51 |
| 2006/0156413 | A1 * | 7/2006 | Oh et al. .......................... 726/26 |
| 2007/0112679 | A1 * | 5/2007 | Kwon .............................. 705/51 |

(Continued)

FOREIGN PATENT DOCUMENTS

| KR | 10-2007-0098368 A |   | 10/2007 |   |
| KR | 10-2009-0032216 A |   | 4/2009 |   |
| WO | WO 2007108619 A1 | * | 9/2007 | ............. G06F 17/00 |
| WO | WO 2007/114657 A1 |   | 10/2007 |   |

*Primary Examiner* — Nirav B Patel
(74) *Attorney, Agent, or Firm* — Birch, Stewart, Kolasch & Birch, LLP

(57) ABSTRACT

Disclosed herein relates to a digital rights management, and more particularly, to a method for upgrading digital rights and a device for providing the same. A method of allowing a terminal to upgrade a rights object installed in a memory card according to an embodiment of the present invention may include allowing the terminal to receive a trigger message comprising a rights object identifier, upgrade information, and AssetID (Asset Identifier) to contents from a Rights Issuer, transmitting an asset identifier message comprising the AssetID to the memory card, receiving a rights information message comprising rights information selected based on the AssetID from the memory card, checking whether the rights information corresponds to the rights object identifier, and generating a rights object based on the rights information to upgrade the rights object.

9 Claims, 6 Drawing Sheets

(56) References Cited

U.S. PATENT DOCUMENTS

| | | | |
|---|---|---|---|
| 2008/0183831 A1* | 7/2008 | Shi et al. | 709/206 |
| 2009/0125718 A1 | 5/2009 | Chu | |
| 2009/0151001 A1* | 6/2009 | Li et al. | 726/26 |
| 2010/0017887 A1* | 1/2010 | Kiyosawa et al. | 726/26 |
| 2011/0072495 A1* | 3/2011 | Chu et al. | 726/4 |
| 2011/0091041 A1* | 4/2011 | Zhang et al. | 380/284 |

* cited by examiner

METHOD AND DEVICE FOR UPGRADING RIGHTS OBJECT THAT WAS STORED IN MEMORY CARD

CROSS REFERENCE TO RELATED APPLICATIONS

This application is a National Phase of International Application No. PCT/KR2010/003922 filed on Jun. 17, 2010 which claims the benefit under 35 U.S.C. §119(e) of U.S. Provisional Application Nos. 61/218,051 and 61/262,114 filed on Jun. 17, 2009 and Nov. 17, 2009 respectively, and to Patent Application No. 10-2010-0030121 filed in the Republic of Korea, on Apr. 1, 2010. The entire contents of all of the above applications are hereby incorporated by reference.

TECHNICAL FIELD

The present invention relates to digital rights management, and more particularly, to a method for upgrading digital rights and a device for providing the same.

BACKGROUND ART

Digital Rights Management (DRM) is a system technology for protecting and managing rights on digital contents, and provides a series of protection and management systems for the process of an illegal copy prevention of contents, acquisition and distribution of a Rights Object (RO) associated with DRM contents, and production and consumption of DRM contents.

FIG. 1 is a view illustrating a general configuration of a DRM system.

A typical DRM system manages digital contents from a contents provider to be used as much as the Rights Object granted to the user. The contents provider is an entity corresponding to a content issuer (CI) 10 and/or a Rights Issuer (RI) 20.

The content issuer (CI) 10 issues a content (hereinafter, referred to as "DRM content" or "digital content") protected by using a specific encryption key to protect the contents from the unauthorized user, and the Rights Issuer (RI) 20 issues a Rights Object that is required for using the DRM contents.

The device 30 includes a DRM agent 40, and the DRM agent 40 receives a DRM content from the content issuer (CI) 10, and receives a right in the form of a Rights Object (RO) which is associated with the contents from the Rights Issuer (RI) 20. The DRM agent can store the Rights Object (RO) into a memory card or a secure removable media (SRM) 50 via an SRM agent 60 included in the SRM 50.

Afterwards, the DRM agent 40 interprets permissions and/or constraints included in the Rights Object (RO), thereby managing the usage of the DRM content in the device 30 and the SRM 50.

The permissions and/or constraints that have been set once in the Rights Object need to be changed as circumstances change. Therefore, a method of adding and/or changing the permissions and/or constraints, that are included in the Rights Object (RO) stored in the SRM 50, is required; in other words, a method of upgrading the Rights Object (RO) in the SRM 50.

For the understanding of the related art and the present invention, hereinafter, the terms used in this specification will be briefly defined in the following Table 1.

TABLE 1

| Term | Definition |
|---|---|
| DRM Agent | An entity in the device that manages permission to media objects on the device. |
| Media Object | The Media Object is a digital work. For example, a ringing tone, a screen saver, a Java game or a composite object, etc. are included in the media object. |
| Permission | The Permission is actual usages or activities allowed (by the Rights Issuer) over DRM Content. |
| DRM Content | The DRM Content is media objects consumed according to a set of authorization in the Rights Object. |
| Secure Authenticated Channel (SAC) | The Secure Authenticated Channel is a logical channel for communication that provides message integrity and confidentiality. |
| Rights | The Rights are the collection of permissions and constraints defining under which circumstances access is granted to DRM content. For the purposes of this document, Rights consist of a Rights Object, its associated state, and other related information. |
| Rights Issuer (RI) | The Rights Issuer is an entity that issues Rights Objects to OMA DRM conformant devices. |
| Handle | The handle is A random value generated by the DRM agent, which is stored in the SRM and in the Operation Log (kept in the Device) used for associating the DRM agent to specific right for the Move or Local Rights Consumption operation. When transmitting a message for using or moving the rights (or Rights Object (RO)), the DRM agent generates the handle and transmits the generated handle to the SRM. |
| Mutual Authentication and Key Exchange (MAKE) | The Mutual Authentication and Key Exchange includes the steps of authentication request/response and key exchange request/response between entities. Once the MAKE is completed, a SAC context is generated for SAC. Specifically, during the MAKE procedure, the DRM agent and the SRM agent negotiate trust model, entity ID and security algorithm, and mutually authenticate each other and exchange keys (session key and MAC key) for the protected communication though SAC. |
| Rights MetaData | The Rights MetaData includes a Rights Object version, an alias of the Rights Object (RO Alias), an identifier of the Rights Issuer (RI Identifier), an address of the Rights Issuer (RI URL), an alias of the Rights Issuer (RI Alias), and a time stamp of the Rights Issuer (RI Time Stamp). |

TABLE 1-continued

| Term | Definition |
|---|---|
| Rights Object (RO) | The Rights Object is also referred to as use rights, including a permission (or constraint) to DRM contents and other attributes connected to the contents.<br>The Rights Object may be typically stored in a device, but may be also stored in a memory card, for instance, SRM. The Rights Object may be stored in the form of a Rights Object Container in SRM. |
| Rights Object Container | The Rights Object Container is one of the forms for storing the Rights Object. The SRM agent considers the Rights Object Container as an opaque object. In other words, the SRM agent does not parse the Rights Object Container.<br>The Rights Object Container includes a <rights> element and a <signature> element. |
| State Information | The State Information denotes a current state of each stateful permission within stateful use rights (for instance, remaining count, interval, start date, etc.). If the usage rights are stateful, then the State Information is included in rights. |
| Rights Information | The Rights Information includes Rights MetaData, a Rights Object Container, and the State Information.<br>The Rights Information has an information structure for including the Rights MetaData, the Rights Object Container, and the State Information. Also, it may be configured with a hierarchical structure, such as XML. |
| Rights Object Encryption Key (REK) | The Rights Objects Encryption Key is an encryption key for Rights Object, and has a binary form, namely, no base64 encoding. |
| Asset Identifier (AssetID) | The Asset Identifier is included in a Rights Object and used to identify DRM content.<br>A Rights Object may be associated with a plurality of the asset identifiers. The plurality of the asset identifiers may be included in the Rights Object in the form of a list of the hashed values which is called as a list of hashed asset identifier (LAID).<br>In addition, the plurality of Rights Object (RO) associated with the same content may have the same AssetID, respectively. |
| SAC Context | Once a SAC has been established, a logical SAC context will exist. The SAC context exists until a new SAC with the same Device and SRM, under the same trust model, is established.<br>By using a pair of SRM Hello messages, the DRM agent may determine whether it communicates with the same SRM. If the DRM agent reuses the SAC context, and sends a secure message to receive a Field Integrity Verification Failed error, it indicates that the SAC context is no longer effective. The DRM agent should establish new SAC.<br>The context maintains information as illustrated in the following Table 2. |

In the above Table 1, information required to configure the SAC context may include the items enumerated in the following Table 2.

TABLE 2

| Name | Description |
|---|---|
| MAC Key | A Message Authentication Code key used for integrity in a SAC session between the DRM agent and the SRM agent. |
| Session Key | An encryption key used for confidentiality in a SAC session between the DRM agent and the SRM agent. |
| Selected Algorithms | Algorithms negotiated through the MAKE procedure. |
| Trust Anchor | Under a certain trust anchor, multiple SACs can be established. If the trust anchor is switched, the device needs to establish another SAC. |
| Entity ID | Indicates a SRM ID for the device (under a trust anchor) and a device ID for the SRM (under a trust anchor). |

The SRM 50 may store the Rights Object (RO) as illustrated in Table 3.

TABLE 3

| Handle | Rights Information | LAID | REK |
|---|---|---|---|

In other words, the SRM 50 may include the handle, the Rights Information, the LAID, and the REK.

In the above Table 1, the Rights MetaData and Rights Object Container may include the elements as illustrated in the following Table 4.

TABLE 4

Rights MetaData

① Rights Object Version: <protectedRO> element::<ro> element::<version> element.
② RO Alias: <protectedRO> element::<ro> element::<roPayloadAliases>::<roAlias> element.
③ RI Identifier: <protectedRO> element::<ro> element::<riID> element.
④ RI URL: <protectedRO> element::<ro> element::<riURL> element.
⑤ RI Alias: <protectedRO> element::<ro> element::<roPayloadAliases> element::<riAlias> element.
⑥ RI Time Stamp: <protectedRO> element::<ro> element::<timeStamp> element.

Rights Object Container

① <rights> element: <protectedRO> element::<ro> element::<rights> element.
② <signature> element: <protectedRO> element::<ro> element::<signature> element.

In the above Table 4, the symbol "::" indicates a sub-element under a specific element. For example, the <protectedRO>::<ro>::<version> element indicates a <version> element which is a sub-element of the <ro> element under the <protectedRO> element. FIG. 2 illustrates the <protectedRO>::<ro>::<version> element.

In order to upgrade a certain Rights Object (RO), it should be able to find the Rights Object among the Rights Objects stored in the SRM 50 using the identifier of the Rights Object, for instance, roID. The roID uniquely identifies the Rights Object, and it may be a <uid> element in the Rights Object. The <uid> element may exist within a <context> element which is a child element of the <rights> element in the Rights Object.

The <uid> element may be included in a hierarchical structure such as XML. Considering the limited computing capability, the SRM 50 may not be able to directly access an element in a complicated XML format. In order to find a Rights Objects corresponding to the given roID, the SRM 50 needs to retrieve the <uid> element of the Rights Object and check whether the <uid> element of a Rights Object matches the roID. However, the SRM 50 may not be able to parse the Rights Object in XML format due to the limited capability. Therefore, for instance, the SRM 50 transmits the Rights Object to the DRM agent 40 so that the DRM agent 40 with relatively strong capability can access the <uid> element in the transmitted Rights Object.

FIG. 3 illustrates an example of a searching procedure for a SRM rights upgrade, where the DRM agent 40 searches rights stored in the SRM 50 for the right to be upgrade. Hereinafter, the procedure will be described in detail with reference to signal flows illustrated in the drawing.

1) The DRM agent 40 becomes aware of the identifier of the Rights Object subject to be upgraded and upgrade information such as permissions and/or constraints via e.g. an upgrade trigger message from the RI 20 (S110). Then, prior to searching Rights Objects stored in the SRM 50, the DRM agent 40 checks whether any Rights Objects stored in the device 30 have a Rights Object identifier (RO ID) that matches the Rights Object identifier included in the upgrade trigger message (S112).

For instance, the DRM agent 40 may access the <uid> element of the Rights Objects, respectively, and find the <uid> element which has the same value as the Rights Object identifier.

If the DRM agent 40 find no Rights Objects in the device 30 that matches the Rights Object identifier, then the DRM agent 40 starts to search Rights Objects stored in the SRM 50.

2) The DRM agent 40 transmits to the SRM agent 60 a handle list query request message, for instance, Handle List Query Request message, which is a request for a list of all handles of rights in the SRM 50 (S114).

The handle list query request message may include the parameters as illustrated in the following Table 5.

TABLE 5

| Field | Description |
| --- | --- |
| LAID (with number of H (AssetID) = 0) | List of AssetID of the contents associated with the rights. The number of H (AssetID) is set to "0." |
| Handle List Length | Maximum length of the handle list that the DRM agent desires to receive per message. |

3) Upon receiving the handle list query request message, the SRM agent 60 processes the request, and transmits a handle list query response message, for instance, Handle List Query Response message, to the DRM agent 40 (S116).

The handle list query response message may include the parameters as illustrated in the following Table 6.

TABLE 6

| Field | Description |
| --- | --- |
| Status | Includes a processing result of the handle list query request. |
| Handle List | List of handles stored in SRM |
| Continuation Flag | 'True' if the Handle List in this response is a part of the whole Handle List and there are subsequent parts of it, and otherwise 'false'. So if 'true' more handle list should be received afterwards. |

4) The DRM agent 40 receives the handle list query response message and checks the handle list (S120). The DRM agent 40 needs Rights Information for each handles in the handle list, so requests each Rights Information in the subsequent steps.

5) The DRM agent 40 transmits to the SRM agent 60 a rights information query request message, for instance, Rights Information Query Request message, which is to obtain the Rights Information corresponding to the handle (S122a).

The rights information query request message may include the parameters as illustrated in the following Table 7.

TABLE 7

| Field | Description |
| --- | --- |
| Handle | Handle that identifies the rights in the SRM whose Rights Information will be transferred |

6) The SRM agent 60 receives the rights information query request message and checks whether the SRM has the right requested by the message. If so, the SRM agent 60 transmits to the DRM agent 40 a rights information query response message, for instance, Rights Information Query Response message, which includes the Rights Information of the right (S124a).

The rights information query response message may include the parameters as illustrated in the following Table 8.

TABLE 8

| Field | Description |
| --- | --- |
| Status | Includes a processing result of the handle list query request. |
| Rights MetaData | Described in the above Table 1 |
| Rights Object Container | Described in the above Table 1 |
| State Information | Described in the above Table 1 |

7) Next, if one or more handles are included in the handle list, the DRM agent 40 repeats the above-mentioned steps 5) and 6) to obtain Rights Information of all the handles (S122b and S124b).

In other words, as illustrated in the dotted line in FIG. 3, the DRM agent 40 and the SRM agent 60 exchange the rights information query request message and the rights information query response message for each handles in the handle list.

8) The DRM agent 40 compares each Rights Information that have been received from the SRM agent 60 with the Rights Object identifier included in the trigger (S130) to find the rights to be upgraded. For instance, the DRM agent 40 checks whether the <uid> element in the Rights Information is same as the Rights Object identifier.

The DRM agent 40 can, by selection, load all information of the right stored in the SRM 50 beforehand for the search for the right to be upgraded.

As described above, the method of upgrading a Rights Object according to the related art has problems that the DRM agent 40 should exchange plenty of messages to acquire the information on the rights stored in the SRM 50 and in the worst case the DRM agent 40 should search for the right to be upgraded exhaustively among all the Rights Object stored in both the device 30 and the SRM 50. Particularly, it is more problematic that, in the first place, Rights Objects stored in the SRM 50 should be transferred to the device 30 for the search.

In addition, the method of all the Rights Information in the SRM 50 being transferred into the device whenever the SRM 50 is inserted into the device 30 is problematic, as it may not be always feasible due to limited storage space in the device 30 and time constraint.

DISCLOSURE OF INVENTION

Solution to Problem

Therefore, the objective of the present invention is to provide a method for upgrading Rights Object (RO) as described above.

Specifically, an object of the present invention is to provide an effective method of directly retrieving and upgrading a right corresponding to the Rights Object identifier among the rights stored in SRM without retrieving the rights stored in the device one by one.

Another object of the present invention is to provide a method for protecting a right in the process of transferring the right from the SRM to the Rights Issuer during the process of upgrading a Rights Object as described above, and a method for protecting the upgraded right during the process of transferring the upgraded right from the Rights Issuer 20 to the SRM 50.

To achieve these and other advantages and in accordance with the purpose of the present invention, as embodied and broadly described herein, there may be provided a method for upgrading a rights object installed in a removable media, the method comprising: receiving, from a Rights Issuer, an upgrade trigger including a rights object identifier, upgrade information, and an asset identifier, wherein the rights object identifier is related to a rights object to be upgraded, and the asset identifier corresponds to contents associated with the rights object; transmitting, to the removable media, a rights information request message including the asset identifier; receiving, from the removable media, a rights information message including rights information and a first identifier of the rights information, wherein the rights information is associated with the asset identifier; checking whether a rights object identifier included in the rights information matches the rights object identifier in the trigger message; performing an encryption key retrieval procedure, wherein the encryption key retrieval procedure comprises: transmitting, to the removable media, an upgrade information request message including the first identifier of the rights information and a newly generated second identifier; and receiving, from the removable media, an upgrade information message including an encryption key for the rights information corresponding to the first identifier; and performing a rights upgrade procedure based on the rights information and the encryption key.

Preferably, the rights information message comprises a plurality of the rights information and a plurality of the first identifier associated with the same asset identifier, thereby the encryption key retrieval procedure is performed respectively for at least one of the rights information, the rights object identifier of which matches the rights object identifier included in the trigger in the step of checking.

Preferably, the rights information request message further comprises a length of the rights information that can be included in the rights information message, and the rights information message is received one or more times, and the rights information message further comprises a flag indicating whether or not subsequent rights information messages follow.

Preferably, wherein the rights information request message is a "RightsInfoListQueryRequest" message and the rights information message is a "RightsInfoListQueryResponse" message.

Preferably, the upgrade information request message is an "UpgradeRightsRetrievalRequest" message and the upgrade information message is an "UpgradeRightsRetrievalResponse" message.

Preferably, the upgrade trigger further comprises a flag indicating that a rights object corresponding to the rights object identifier is stored in the removable media.

Preferably, the rights upgrade procedure comprises: transmitting to the Rights Issuer the rights object, rights object upgrade information, and a signature signed by the terminal; acquiring an upgraded rights object from the Rights Issuer; generating an LAID (a list of hashed asset identifiers), an encryption key of the upgraded rights object, and rights information of the upgraded rights object based on the upgraded rights object; and transmitting the identifier of the rights object, an identifier of the upgraded rights object, the LAID, the encryption key of the upgraded rights object, and the rights information of the upgraded rights object to the removable media for installation of the upgraded rights object; and acquiring a result of an upgrade of the rights object from the removable media.

Preferably, the rights object and the upgraded rights object are protected using a public key of the terminal.

Preferably, the rights upgrade procedure comprises: transmitting a rights object upgrade request message including the rights object, rights object upgrade information, and a signature to the Rights Issuer for upgrade of the rights object, wherein the signature is a digital signature on the rights object upgrade request message signed by the removable media; acquiring an upgraded rights object from the Rights Issuer, wherein the upgraded rights object is a protected rights object; verifying the upgraded rights object; generating an LAID and rights information of the upgraded rights object based on the upgraded rights object; and transmitting an identifier of the upgraded rights object and the rights information of the upgraded rights object to the removable media for installation of the upgraded rights object.

According to another aspect of the present invention, there may be provided a method for upgrading a rights object installed in a removable media, the method comprising: receiving from a Rights Issuer an upgrade trigger including a rights object identifier, upgrade information and an asset identifier, wherein the rights object identifier is related to a rights object to be upgraded, and the asset identifier corresponds to contents associated with the rights object; transmitting, to the removable media, a rights information request message including the asset identifier; receiving, from the removable media, a rights information message including rights information associated with the asset identifier and an encryption key for the rights information; receiving, from the removable media, a first identifier of the rights information; checking whether a rights object identifier in the rights information matches the rights object identifier in the trigger message; transmitting, to the removable media, an identification message including the first identifier of the rights information and a newly generated second identifier; and performing a rights upgrade procedure based on the rights information and the encryption key.

Preferably, the rights information message comprises a plurality of the rights information and a plurality of the first identifier associated with the same asset identifier, the identification message is transmitted respectively for at least one of the rights information that corresponds to the first identifier and the rights object identifier of which matches the rights object identifier in the trigger in the step of checking.

According to another aspect of the present invention, there may be provided a terminal of upgrading a rights object installed in a removable media, comprising: a transceiver configured to receive a trigger message including a rights object identifier, upgrade information and AssetID (Asset Identifier) for contents from a Rights Issuer, to transmit the rights object, rights object upgrade information and a signature for upgrade of the rights object, and to receive an upgraded rights object; a processor configured to validate whether the rights information matches the rights object identifier, and to generate the rights object based on the rights information and an encryption key for the rights information; and a connector connected to the removable media, and configured to receive the rights information and the encryption key associated with the AssetID from the removable media, to transmit identifier of the rights object and identifier of the upgraded rights object for installation of the upgraded rights object, and to receive a result of an upgrade of the rights object.

The present invention provides an effective method for upgrading a Rights Object where the DRM agent 40 can find the specific Rights corresponding to the Rights Object identifier among the Rights stored in SRM 50 without retrieving information on the Rights stored in the device. Therefore, the DRM agent 40 and SRM agent 60 can reduce computations and the DRM agent 40 can save the amount of memory required comparing to a case where all information of the right in the SRM 50 should be loaded in the DRM agent 40.

Moreover, in the course of the Rights Object upgrade process the present invention additionally provides a method for protecting a right during the transmission from the SRM 50 to the Rights Issuer 20, and a method for protecting an upgraded right during the transmission from the Rights Issuer 20 to the SRM 50. Therefore, the necessary protection methods may be applied for the Rights Object upgrade procedure considering the required security level.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
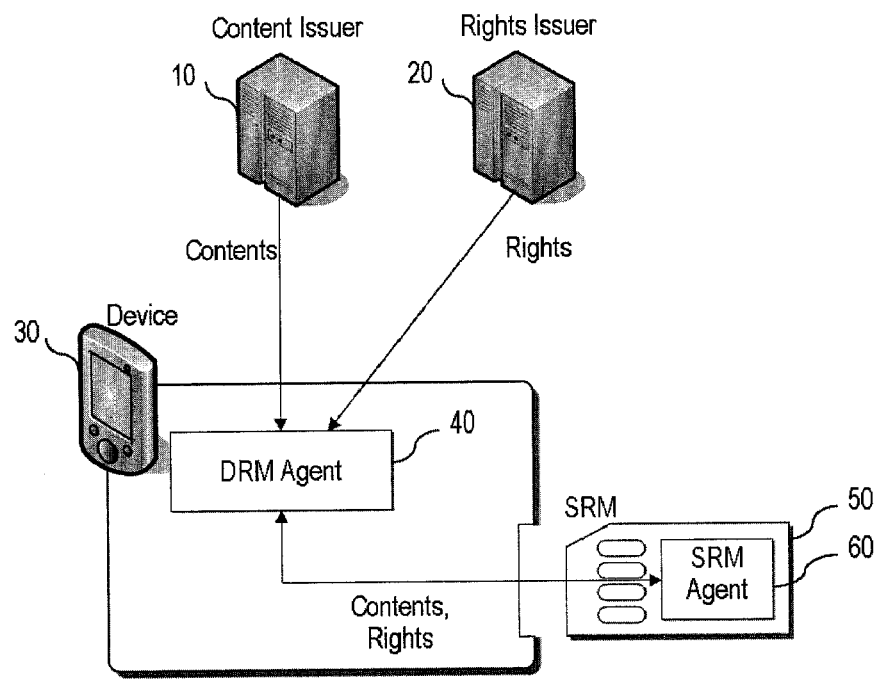
FIG. 1 is a view illustrating a configuration of a typical DRM system.
Figure 2:
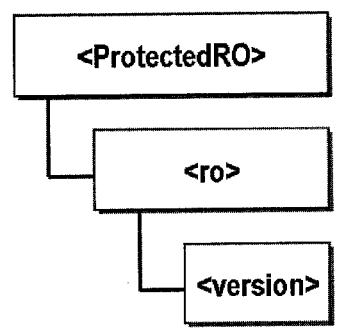
FIG. 2 illustrates a view illustrating a relation between elements.
Figure 3:
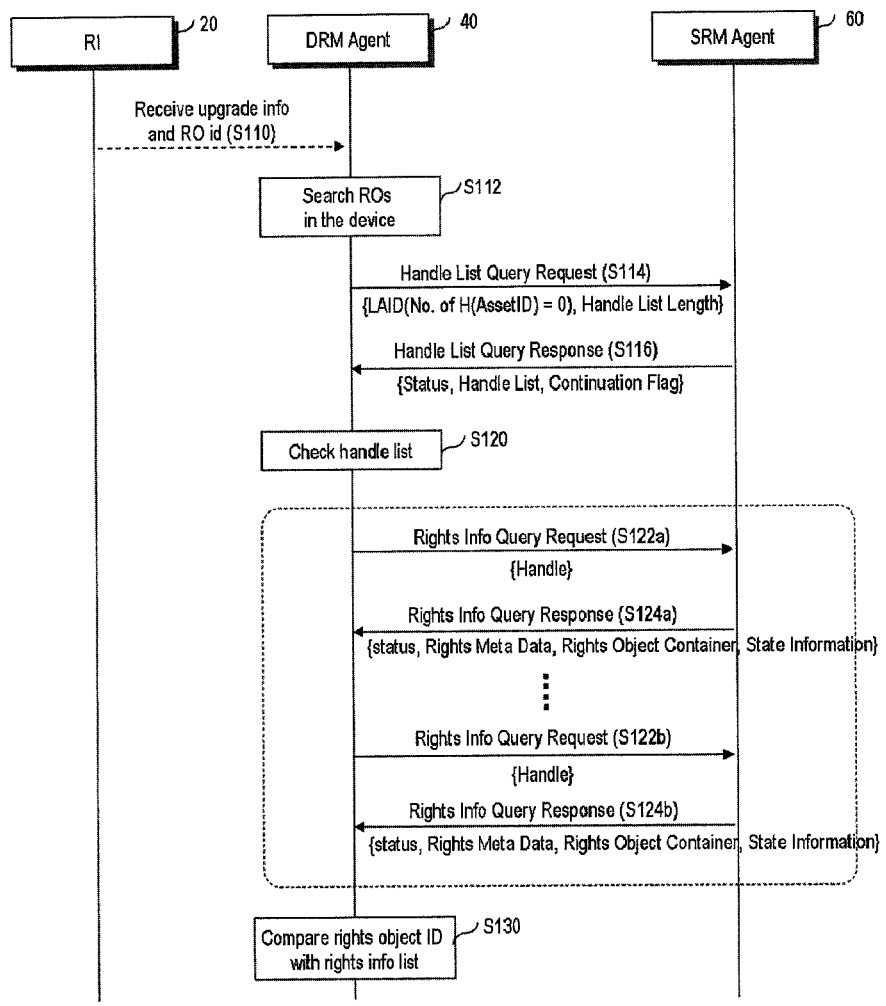
FIG. 3 is a procedural flow chart illustrating a procedure of checking whether a right corresponding to the rights identifier is stored in the SRM 50.

The present invention will be applicable to a digital rights management (DRM) system. However, the present invention will not be limited to the foregoing system, but may be applicable to all communication systems and methods to which the technical ideas of the invention are applied, and other digital rights management related systems and methods.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, the terms used herein including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

Hereinafter, the term "device" herein is used with a meaning, commonly referred to as a user equipment (UE), a mobile equipment (ME), and a mobile station (MS). Furthermore, the device may be portable equipment such as a portable phone, a PDA, a smart phone, and a notebook, or non-portable equipment such as a PC, and a vehicle-loaded device.

Hereinafter, an embodiment of the present invention will be described with reference to the accompanying drawings.

In case of the forgoing related art, the DRM agent 40 should load information on all the right stored in the SRM 50 in advance, or search all the right stored in the SRM 50. In order to search the right stored in the SRM 50, the DRM agent 40 should request and receive the handle list of all the right stored in the SRM 50, and then retrieve Rights Information of all handles in the handle list respectively from the SRM 50. Therefore, in the worst case the DRM agent 40 should search all the Rights stored in the device 30 and the SRM 50.

The user may request an upgrade of a specific Rights while browsing web pages. In this scenario the specific Rights may be a Rights associated with the content that the user is rendering. In this case, a specific asset identifier (AssetID) of the contents is also recognized besides the associated Rights.

If the RO upgrade trigger message includes an AssetID (or a plurality of AssetID) associated with the right to be upgraded, then the DRM agent 40 can use the AssetID for requesting the SRM agent 60 for a handle, REK and Rights Information of the Rights associated with the AssetID.

The AssetID is stored in the SRM 50 as included in LAID. The LAID has a relatively simple structure compared to XML format, so the SRM agent 60 is able to access the AssetID in the LAID. Therefore, the SRM agent 60 can search the LAID to find the right that has the same AssetID received from the DRM agent 40. However, as illustrated above in the Table 1, the roID and the AssetID are not in one-to-one relation. Therefore, the SRM agent 60 transfers information on the Rights with the corresponding AssetID to the device 30, and the DRM agent 40 checks whether the Rights corresponds to the roID. For The Rights in plural with the same AssetID, the DRM agent 40 respectively checks whether the identifier of the Rights matches the roID that has been included in the trigger.

In addition, if the information on whether the right to be upgraded resides in the SRM 50 is included in the RO upgrade trigger message, the DRM agent 40 does not need to search the Rights Object in the device 30.

The first and the second embodiments according to the present invention, which will be described later, relate to the above case where the RO upgrade trigger message includes the information on the location and the Asset ID of the Rights subject to be upgraded.

Figure 4:
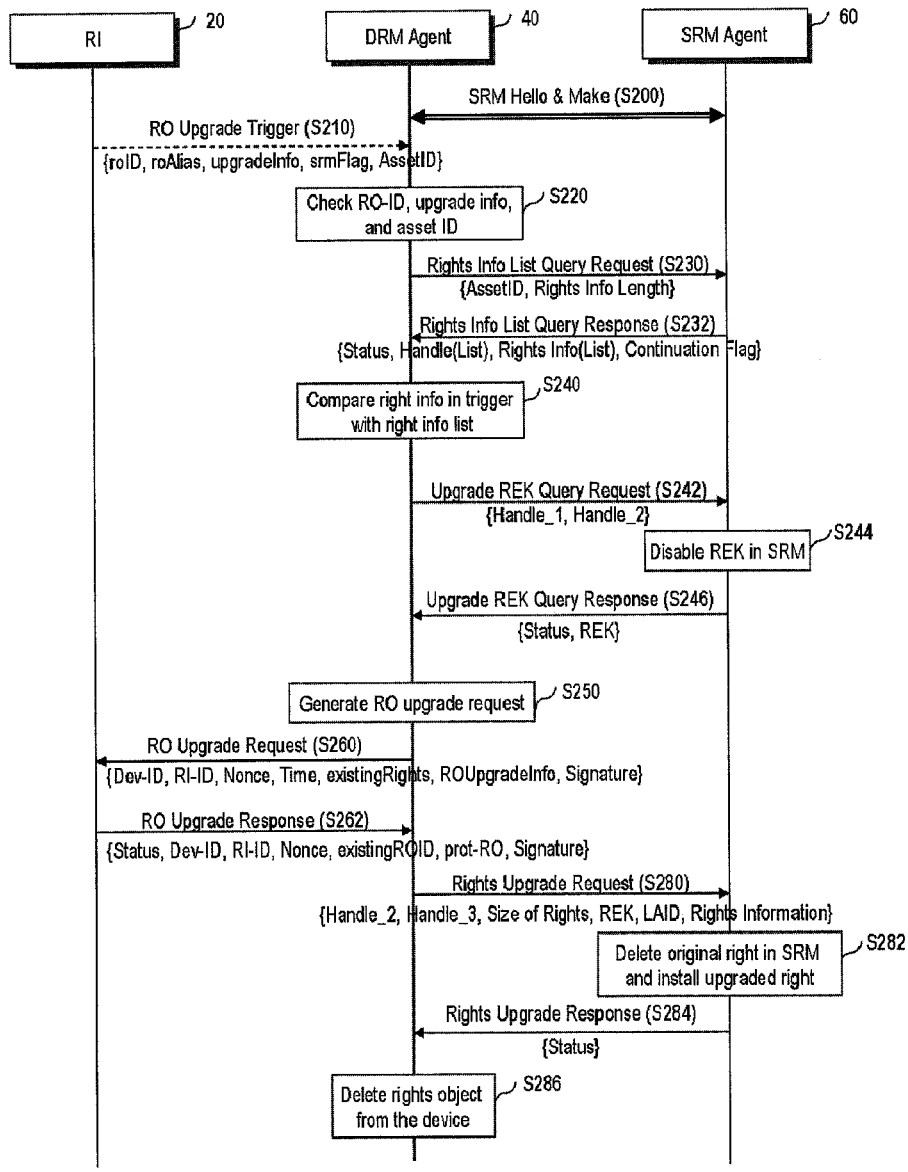
FIG. 4 is a view illustrating a SRM rights upgrade procedure according to an embodiment of the present invention.

FIG. 4 is a view illustrating a SRM rights upgrade procedure according to a first embodiment of the present invention. Hereinafter, the procedure will be described in detail with reference to signal flows illustrated in the drawing.

1) First, the DRM agent 40 completes necessary negotiations and a Mutual Authentication and Key Exchange procedure described in the above Table 1 for communication with the SRM agent 60, and generates a SAC context (S200).

The DRM agent 40 and the SRM agent 60 determine a same trust anchor, and recognize IDs of each other. Furthermore, the DRM agent 40 and the SRM agent 60 can exchange messages with confidentiality and integrity in the communication.

2) Next, the RI 20 transmits a RO upgrade trigger message, for instance, RO Upgrade Trigger message, to the DRM agent 40, to upgrade a right stored in the SRM 50, thereby informing the start of the Rights Object (RO) upgrade procedure (S210). The message may include the parameters as illustrated in the following Table 9.

TABLE 9

| Field | Description |
|---|---|
| roID | An identifier of the Rights Object to be upgraded (Rights Object Identifier; RO ID). |
| roAlias | A name indicating the Rights Object, which is included optionally. |
| UpgradeInfo | Includes information such as permission and constraint to be added to the Rights Object. |
| srmFlag | Indicates that a right to be upgraded in the trigger message resides in the SRM rather than in the device. This is an optional parameter. |
| AssetID | Identifier of contents associated with the rights to be upgraded. i.e., indicating assetID included a <rights> element. The AssetID may be transmitted in the form of the list (LAID) which is as follows. The AssetID will be used as a keyword for searching the right stored in the SRM. |
| LAID | A list of asset identifiers that is used selectively when the AssetID is being transmitted. It is transmitted in the form of a list of hash (Asset ID), which is a same value as the LAID specified at an interface between the DRM agent and the SRM agent. When LAID is used, the LAID is easily compared with the LAID stored in SRM. The LAID will be a keyword for searching the Rights stored in SRM. |

3) After the DRM agent 40 receives the RO upgrade trigger message, the DRM agent 40 performs the following procedure (S220).

In case that srmFlag is included in the trigger message, then the DRM agent 40 can recognize that the right to be upgraded resides in the SRM 50.

The DRM agent 40 checks the Rights Object identifier for a rights to be upgraded, and UpgradeInfo for the information on permissions and/or constraints to be added, and the AssetID (or the LAID) for the keyword for searching the right stored in the SRM 50.

In the steps that follow, the DRM agent 40 requests information of the right in the SRM 50 using the AssetID (or the LAID) rather than the Rights Object identifier.

4) Next, the DRM agent 40 transmits a rights information list query request message, for instance, Rights Info List Query Request message, to the SRM agent 60 to request information on the right to be upgraded (S230).

The message may include the parameters as illustrated in the following Table 10.

TABLE 10

| Field | Description |
|---|---|
| AssetID (or LAID) | AssetID (or LAID) for the right to be upgraded, which is AssetID (or LAID) included in the RO upgrade trigger message. |
| Rights Info Length | Length of the rights information that the device desires to receive per message. In the case that there are multiple Rights in the SRM associated with AssetID (or LAID) in SRM, so the SRM agent should be informed of the number of Rights to transfer per message. |

5) Next, the SRM agent 60 transmits a rights information list query response message, Rights Info List Query Response message, to the DRM agent 40 to transmit a handle (or a list of the handle) and Rights Information (or a list of the rights information) that match the AssetID (or the LAID) from the DRM agent 40 (S232).

The message may include the parameters as illustrated in the following Table 11.

TABLE 11

| Field | Description |
| --- | --- |
| Status | Includes a processing result to the rights information list query request. The status includes "success" if the relevant right is successfully found, and otherwise it includes an error or error code. |
| Handle (List) | Includes a handle (or a list of handles) of the Rights corresponding to the rights information list query request if found. |
| Rights Info (List) | Includes Rights Information (or a list of Rights Information) of the Rights corresponding to the rights information list query request If found. |
| Continuation Flag | Indicates that a length of the (list of) Rights Information is longer than the length that the device desires to receive in a message. If it is set to True, the DRM agent needs to request for further information |

6) After the DRM agent 40 receives the rights information list query response message, then the DRM agent 40 checks the Rights Information (or the list of the Rights Information) in the message with the Rights Object identifier (S240). For instance, the DRM agent 40 checks whether the <uid> element of the Rights Information (or a list of the Rights Information) matches the Rights Object identifier.

As described above, since the content corresponding to the AssetID can be associated with a plurality of Rights Object, the response message can include a plurality of the Rights Information associated with the AssetID. Also it is possible that none of the Rights Information in the message matches the Rights Object identifier.

As to the right that matches the Rights Object identifier, the DRM agent 40 request the SRM agent 60 for REK thereof in the following steps.

7) Next, the DRM agent 40 transmits an upgrade REK query request message, for instance, Upgrade REK Query Request message, to the SRM agent 60 to request REK of the right to be upgraded (S242).

The message may include the parameters as illustrated in the following Table 12.

TABLE 12

| Field | Description |
| --- | --- |
| Handle__1 | A handle of the right to be upgraded. |
| Handle__2 | A new handle to replace the Handle__1 with. |

8) Upon receiving the upgrade REK query request message, the SRM agent 60 performs the following procedure (S244).
 The SRM agent 60 finds the Rights identified by the Handle__1 to check the REK of the Rights.
 The SRM agent 60 disables the Rights identified by the Handle__1, and changes the handle of the Rights to be the Handle__2. The Rights disabled is excluded from a search by the DRM agent 40 until it is enabled.
 The REK of the right that is found is transferred to the DRM agent 40 by an upgrade REK query response message that follows.

9) Next, the SRM agent 60 transmits an upgrade REK query response message, for instance, Upgrade REK Query Response message, to the DRM agent 40 to transfer the REK (S246).

The message may include the parameters as illustrated in the following Table 13.

TABLE 13

| Field | Description |
| --- | --- |
| Status | Includes a processing result to the upgrade REK query request message. |
| REK | REK of the Rights retrieved. It may be encrypted with a session key (SK) shared between the DRM agent and the SRM agent. |

10) After the DRM agent 40 receives the upgrade REK query response message, the DRM agent 40 generates a rights object upgrade request message, for instance, RO Upgrade Request message, based on the Rights Information and the REK received from the SRM agent 60, and the upgradeInfo received from the RI 20 (S250). In this point, the user may add permission and/or constraint to the upgradeInfo.

The message may include the parameters as illustrated in the following Table 14.

TABLE 14

| Field | Description |
| --- | --- |
| Device-ID (Dev-ID) | An ID of the device requesting a Rights Object upgrade. |
| RI-ID | An ID of RI that has issued the Rights Object. An ID of RI to request an upgrade. |
| Nonce | A random value generated by the DRM agent. |
| Time | Timing when generating a Rights Object upgrade request. |
| existingRights | A Rights Object previously issued from the RI, for instance, existing RO. It may be the form of a protected RO in OMA DRM 2.0. |
| ROUpgradeInfo | Information to be added to the existing RO, such as permissions, constraints, etc. |
| Signature | A digital signature signed by the DRM agent on the rights object upgrade request message. |

11) Next, the DRM agent transmits the rights object upgrade request message to the RI 20 to request the issuance of an upgraded right over the right previously issued from the RI 20 (S260).

12) Upon receiving the rights object upgrade request message the RI 20 can check whether the Rights Object (i.e., existingRights) in the request message is issued by the RI 20.

The RI 20 generates a new upgraded Rights Object that has newly granted permission and/or constraint compared to the previous Rights Object based on the rights upgrade information from the DRM agent 40. The RI 20 transmits, to the DRM agent 40, a rights object response message, for instance, RO Response message, to transfer the upgrade Rights Object to the DRM agent 40 (S162).

The message may include the parameters as illustrated in the following Table 15.

TABLE 15

| Field | Description |
| --- | --- |
| Status | Includes a processing result to the rights object upgrade request. |
| Device-ID (Dev-ID) | An ID of the device requesting a Rights Object upgrade. |
| RI-ID | An ID of RI that has issued the Rights Object. An ID of RI to request an upgrade. |
| Nonce | A random value generated by the DRM agent. |
| Time | Timing when generating a rights object upgrade request. |
| existingRO-ID | The Rights Object ID same as the Rights Object previously issued from the RI. It is transferred in the form of a protected RO in the OMA DRM 2.0. |

TABLE 15-continued

| Field | Description |
|---|---|
| protectedRO | An upgraded Rights Object that has been issued from the RI. It may be the form of a protected RO in OMA DRM 2.0, which is protected by using a RSA public key of the device. |
| Signature | A digital signature signed by the RI on the rights object upgrade response message. |

13) After the DRM agent 40 receives the rights object response message, the DRM agent 40 performs an operation for upgrading the right stored in the SRM 50. In other words, the DRM agent 40 transmits a rights upgrade request message, for instance, Rights Upgrade Request message, to the SRM agent 60.

At this time, the DRM agent 40 may transcript the upgraded Rights Object (i.e., the protectedRO) received from the RI 20 into a format that the SRM agent 60 can recognize. The format that the SRM agent 60 can recognize may include the size of rights, REK, LAID, and Rights Information, that are supported by SRM 1.0.

Furthermore, the rights object upgrade request message may include the Handle_2 newly assigned to be a replacement of the Handle_1 and new Handle_3 for identifying the rights to be upgraded.

In other words, the rights object upgrade request message may include the parameters as illustrated in the following Table 16.

TABLE 16

| Field | Description |
|---|---|
| Handle_2 | A handle that identifies the right stored in SRM. The Handle_2 is known to only the DRM agent that has performed a SRM rights upgrade. |
| Handle_3 | A new unique ID for distinguishing the right while storing an upgraded right. It is generated by the DRM agent and encrypted in transmission. |
| Size of Rights | Size of the upgraded Rights Information. |
| REK | REK of the upgraded right. |
| LAID (List of Hash (Asset ID)) | List of AssetID of the contents associated with the rights. |
| Rights Information | Rights Information of the rights to be upgraded. This includes Rights MetaData, Rights Object Container, and State Information. |

14) The SRM agent 60 receives the rights object upgrade request message, and deletes the original right that has been requested for upgrade based on the message, and installs a newly upgraded right in the SRM 50 (S282).

The procedure after the reception of the rights object upgrade request message may be carried out in detail as follows.

The SRM agent 60 deletes a right indicated by the Handle_2.

Next, the SRM agent 60 reserves a space for an upgraded right to be installed. The size of the right means the size of the Rights Information.

Next, the SRM agent 60 stores the Rights Information, the LAID, the REK, etc. in a space indicated by the Handle_3. In other words, the upgraded right with newly added permission and/or constrain is stored.

15) Next, the SRM agent 60 transmits a result of the rights upgrade to the DRM agent 40 through a rights upgrade response message, for instance, Rights Upgrade Response message (S284).

The rights upgrade response message may include the parameters as illustrated in the following Table 17.

TABLE 17

| Field | Description |
|---|---|
| Status | Includes a processing result to the rights upgrade request. It includes "success" if the processing result is successful, and includes "fail" and a reason code for the failure if the processing result is failed. |

16) Finally, the DRM agent 40 receives the rights upgrade response message (S286).

If the result of the rights upgrade is success, the DRM agent 40 may delete the copy of the upgraded Rights Object in the DRM agent 40. Also, instead of deleting the upgraded Rights Object, the DRM agent 40 may disable the upgraded Rights Object, The DRM agent 40 may hold it disabled possibly for the case of enabling it again, or otherwise the DRM agent 40 may delete the upgraded Rights Object.

Figure 5:
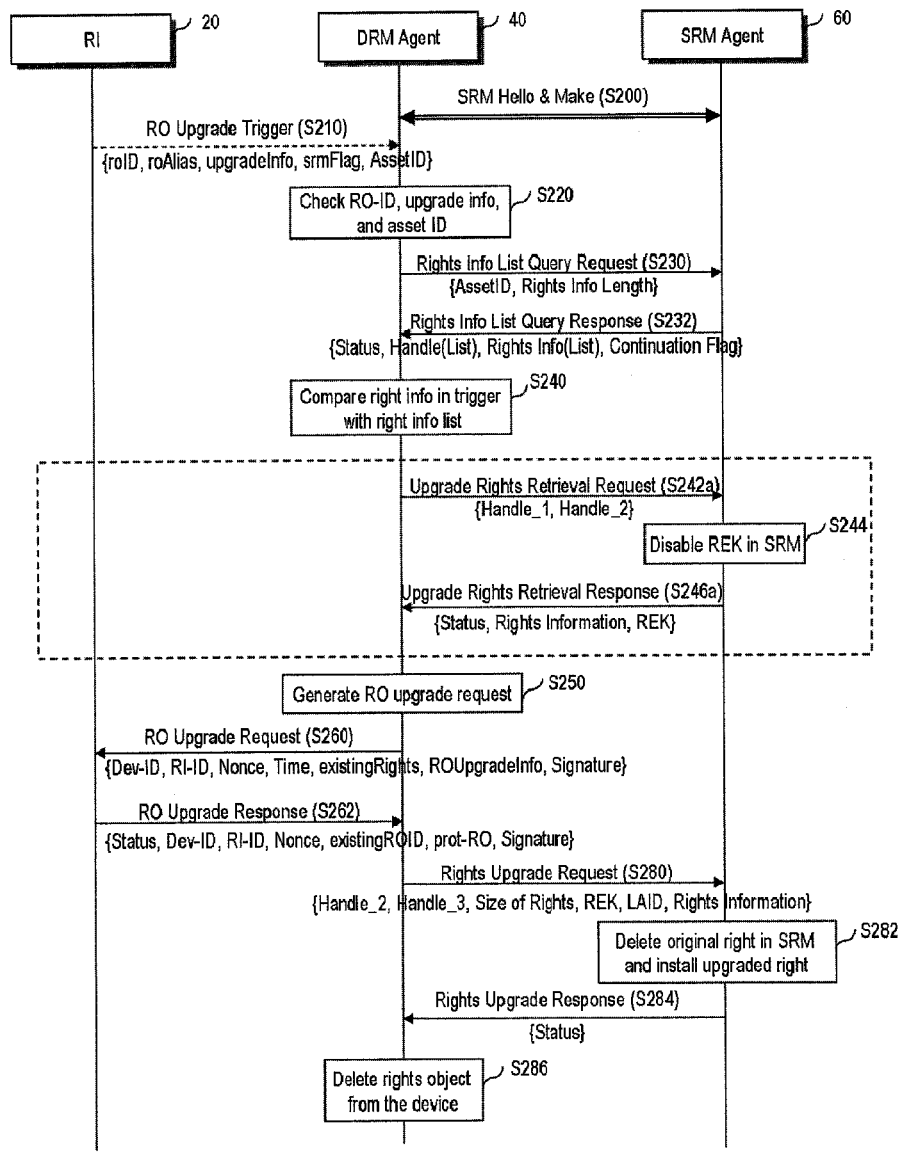
FIG. 5 is a view illustrating a modified SRM rights upgrade procedure according to an embodiment of the present invention.

Furthermore, FIG. 5. illustrates a modification of the first embodiment of the invention.

In the modified embodiment shown in FIG. 5, a rest of the steps other than (S242a, S244a, and S246a) illustrated in the dotted line are same as the steps of the embodiment shown in FIG. 4. Therefore, only these steps (S242a, S244a, and S246a) illustrated in the dotted line will be described in detail.

First, the steps (S200 through S240) illustrated above in FIG. 4 will be performed.

1) Next, the DRM agent 40 transmits an upgrade rights retrieval request message, for instance, Upgrade Rights Retrieval Request message, to the SRM agent 60 to request Rights Information and REK of the right to be upgraded (S242a).

The message may include the parameters as illustrated above in the Table 12.

2) After the SRM agent 60 receives the upgrade rights retrieval request message may perform the following procedure (S244a).

The SRM agent 60 retrieves the right indentified by the Handle_1 to check the REK and Rights Information of the Rights.

The SRM agent 60 disables the right indentified by the Handle_1, and changes the handle of the rights to be the Handle_2. The disabled right is excluded from a search by the DRM agent until it is enabled.

The REK and the Rights Information of the right that is found are transferred to the DRM agent 40 by an upgrade rights retrieval response message that follows.

3) Next, the SRM agent 60 transmits an upgrade rights retrieval response message, for instance, Upgrade Rights Retrieval Response message, to the DRM agent 40 to transfer the REK and the Rights Information (S246a).

The message may include the parameters as illustrated in the following Table 18.

TABLE 18

| Field | Description |
|---|---|
| Status | Includes a processing result to the upgrade rights retrieval request message. |
| Rights Information | Described in the above Table 1. The integrity protection for Rights Information may be provided using HMAC by a MAC key (MK) that has been shared between the DRM agent 40 and the SRM agent 60. |
| REK | Described in the above Table 1. The REK may be encrypted with a session key (SK) that has been shared between the DRM agent 40 and the SRM agent 60. |

Then, the steps (S250 through S286) illustrated above in FIG. 4 will be performed.

While the Rights Information and the REK of the right to be upgraded are transferred separately via different messages in the first embodiment, the Rights Information and the REK are transferred via a single message in the second embodiment which will be described later.

Figure 6:
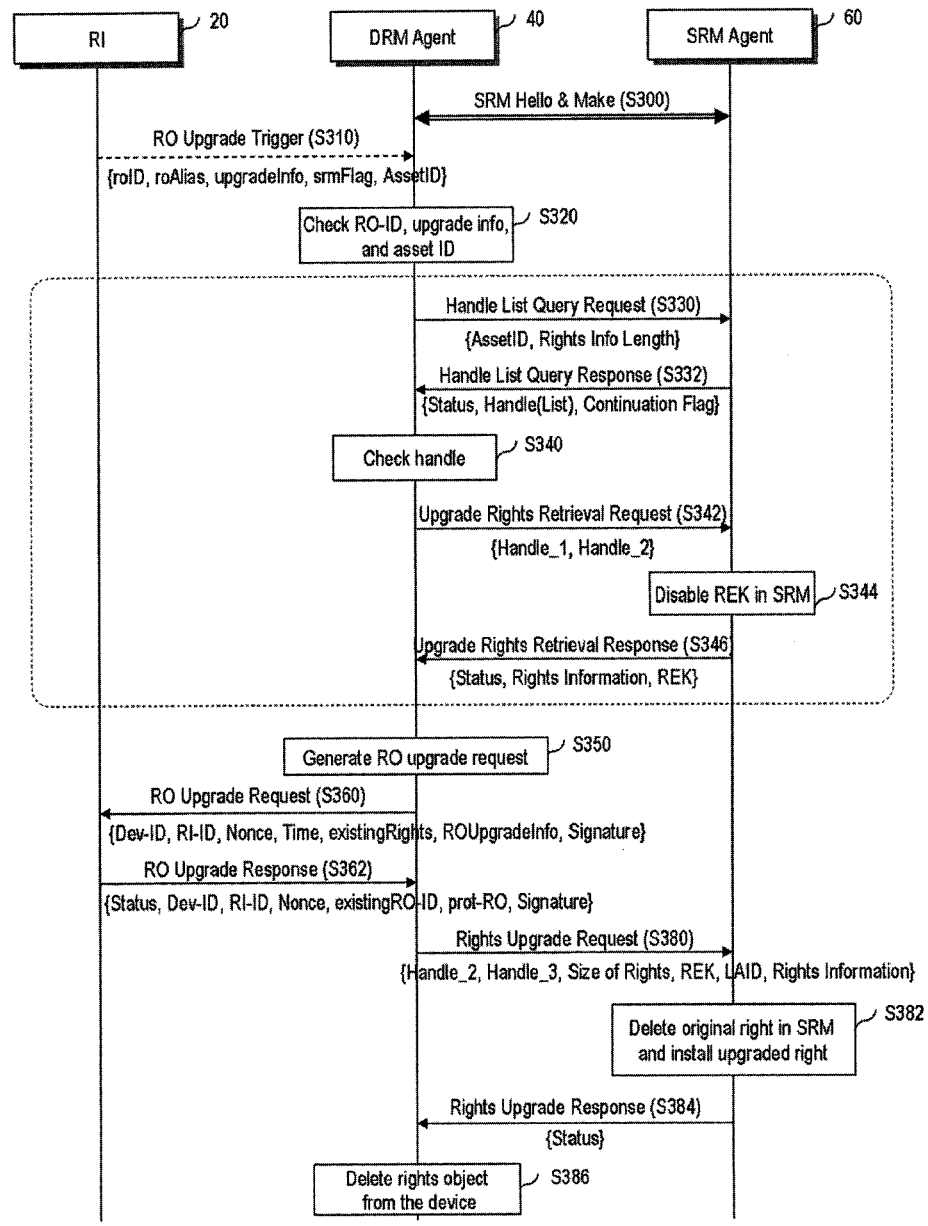
FIG. 6 is a view illustrating a SRM rights upgrade procedure according to another embodiment of the present invention.

FIG. 6 is a view illustrating a SRM rights upgrade procedure according to a second embodiment of the present invention. Hereinafter, the procedure will be described in detail with reference to signal flows illustrated in the drawing.

However, some steps (S300, 5310, 5320, 5350, 5360, 5362, 5380, 5382, 5384, and S386) correspond to the steps (S200, 5210, 5220, 5250, 5260, 5262, 5280, 5282, S284, and S286) shown in the first embodiment of the present invention. Thus, to avoid their redundant description, only the steps (S330, 5332, 5340, 5344, and 5346, i.e., the steps illustrated in the dotted line) which do not correspond to the steps of the first embodiment will be described for this embodiment.

1) The DRM agent 40 transfers a handle list query request message, for instance, Handle List Query Request message, to the SRM agent 60 to request information about the right to be upgraded (S330).

The message may include the parameters as illustrated in the above Table 10.

2) Next, the SRM agent 60 transmits a handle list query response message, for instance, Handle List Query Response message, to the DRM agent 40 to transmit a handle (or a list of the handle) which is associated with the AssetID (or the LAID) received from the DRM agent 40 (S332).

The message may include the parameters as illustrated in the following Table 19.

TABLE 19

| Field | Description |
|---|---|
| Status | Includes a processing result to the handle list query request. The status includes "success" if the relevant right is successfully retrieved, and otherwise it includes an error or error code. |
| Handle (List) | If a right corresponding to the handle list query request is retrieved, then it includes a handle (or a list of the handle) to the relevant Rights. |
| Continuation Flag | Indicates that a length of the (list of) handle is longer than the length that the device desires to receive in a message. If it is set to True, the DRM agent needs to request for further information |

3) After the DRM agent 40 receives the handle list query response message, the DRM agent 40 checks the handle (or a list of the handle) in the message (S340). Generally, a handle of the right to be upgraded is received.

Afterwards, the steps of 4) through 6) (S342, S344, and S346) on the handle will follow. Moreover, in case that a plurality of handles are transmitted, the steps of 4) through 6) (S342, S344, and S346) will be performed for each handle as many times as the number of the handles.

4) Next, the DRM agent 40 transmits an upgrade rights retrieval request message, Upgrade Rights Retrieval Request message, to the SRM agent 60 to request rights information and REK of the right to be upgraded (S342).

The message may include the parameters as illustrated in the above Table 12.

5) After the SRM agent 60 receives the upgrade rights retrieval request message, the SRM agent 50 performs the following procedures (S344).

The SRM agent 60 finds the Rights identified by the Handle_1 to check the REK and the Rights Information of the Rights.

The SRM agent 60 disables the Rights identified by the Handle_1, and changes the handle of the Rights to be the Handle_2. The Rights disabled is excluded from a search by the DRM agent 40 until it is enabled.

The REK and the Rights Information of the right that is found are transferred to the DRM agent 40 by an upgrade rights retrieval query response message that follows.

6) Next, the SRM agent 60 transmits an upgrade rights retrieval response message, for instance, Upgrade Rights Retrieval Response message, to the DRM agent 40 to transfer the REK and the rights information (S346).

The message may include the parameters as illustrated in the above Table 18.

After the DRM agent 40 receives the upgrade right retrieval response message, the DRM agent 40 checks whether the Rights Information in the message corresponds to the Rights Object identifier. If the Rights Information in the message does not correspond to the Rights Object identifier, then the DRM agent 40 may not perform the following procedures of this embodiment for the Rights Information and the REK in the message.

Moreover, in case that a plurality of handles have been transmitted, the DRM agent 40 receives the upgrade rights retrieval response messages for each handle. If the DRM agent 40 finds the Rights Information corresponding to the Rights Object identifier, the DRM agent 40 may not perform the above procedure to receive the REK and the Rights Information for the rest of handle(s).

Moreover, as to the handles that the above procedure is not performed for, the DRM agent 40 and the SRM agent 60 may perform a procedure to enable the right in the SRM 50 identified by the handles.

The above-mentioned embodiments of the present invention provide a protection for the transmission of a right from the SRM 50 to the RI 20. A third embodiment, which will be described later, provides a protection for the transmission of an upgraded right from the RI 20 to the SRM 50. These two protections are independently achievable and meaningful, and thus the necessary protections can be applied for the right upgrade procedure considering the required security level.

In addition, in a method provided according to the third embodiment, when an upgraded Rights Object is being stored in the SRM 50, a storage space in the SRM 50 can be reserved beforehand in consideration of the size of the upgraded Rights Object. Hence, the method provided according to the third embodiment may solve the problem of any other methods in which a predetermined amount of space (for instance, 65536 bytes) should be reserved when a right stored in the SRM 50 is transferred to the device 30 for an upgrade.

Figure 7:
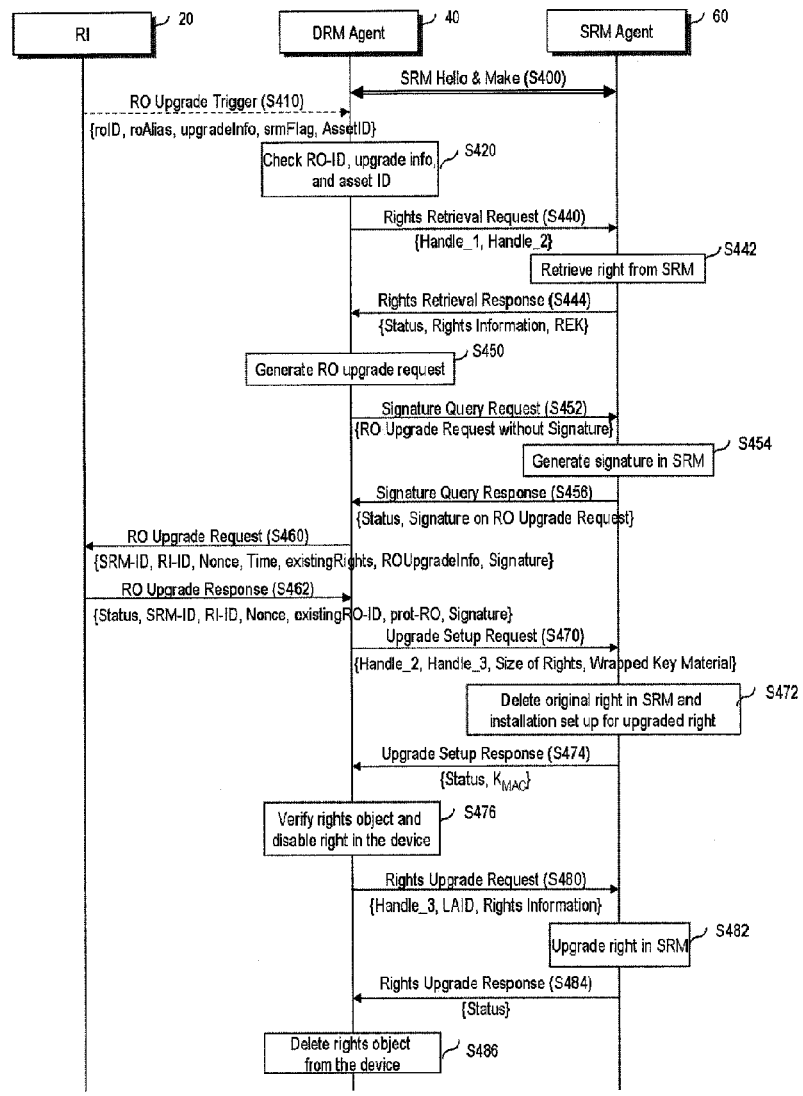
FIG. 7 is a view illustrating a SRM rights upgrade procedure according to still another embodiment of the present invention.

FIG. 7 is a view illustrating a SRM rights upgrade procedure according to a third embodiment of the present invention. Hereinafter, the procedure will be described in detail with reference to signal flows as illustrated in the drawing.

1) First, the DRM agent 40 completes necessary negotiations and a Mutual Authentication and Key Exchange procedure for communication with the SRM agent 60 (S400). The procedure is same as the procedure 1) (S200) as described in the above FIG. 4.

2) Next, the RI 20 transmits a RO upgrade trigger message, for instance, RO Upgrade Trigger message, to the DRM agent 40 to upgrade a right stored in the SRM 50, thereby informing the start of the Rights Object (RO) upgrade procedure (S410). This procedure is same as the procedure 2) (S200) of the first embodiment.

3) After the DRM agent receives the RO upgrade trigger message, the DRM agent 40 performs a same procedure as of 3) (S220) of the first embodiment (S420).

4) Next, the DRM agent 40 transmits a rights retrieval request message, for instance, Rights Retrieval Request message, to the SRM agent 60 to replace a handle of the right to be upgraded (S440).

The message may include the parameters as illustrated in the above Table 12.

5) After the SRM agent 60 receives the rights retrieval request message, the SRM agent 60 performs the following procedure (S442).

The SRM agent 60 disables the right identified by the Handle__1, and changes the handle of the right to be the Handle__2. Since the handle has been changed, only the DRM agent 40 which has transmitted the upgrade rights retrieval request message. Thus, other DRM agents cannot access the right identified by Handle__2 in the SRM 50. In addition, the handle of the disabled right is excluded from a search in a handle list query procedure.

6) Next, the SRM agent 60 transmits a rights retrieval response message, for instance, Rights Retrieval Response message, to the DRM agent 40 to transfer the right to be upgraded (S444).

The message may include the parameters as illustrated in the following Table 20.

TABLE 20

| Field | Description |
|---|---|
| Status | Includes a processing result to the rights retrieval request. |
| Rights Information | Described in the above Table 1. The integrity protection for Rights Information may be provided using HMAC by a MAC key (MK) that has been shared between the DRM agent 40 and the SRM agent 60. |
| REK | Described in the above Table 1. The REK may be encrypted with a session key (SK) that has been shared between the DRM agent 40 and the SRM agent 60. |

The procedures 4) through 6) (S440, S442, and S444) are to obtain Rights Information and REK of a Rights Object associated with the AssetID. Thus, the procedures 4) through 6) (S440, S442, and S444) may be replaced with the procedures 4) through 9) (S230, S232, S240, S242, S244, and S246) of the first embodiment or the procedures 1) through 6) (S330, S332, S340, S342, S344, and S346) of the second embodiment.

7) After the DRM agent 40 receives the upgrade rights retrieval response message, then the DRM agent 40 generates a Rights Object based on the message. In addition, the DRM agent 40 generates a rights object upgrade request message, for instance, RO Upgrade Request message, to transfer the generated Rights Object to the RI 20 (S450).

The Rights Object may be generated based on the Rights Information and the REK included in the rights retrieval response message, and may include the upgradeInfo received from the RO upgrade trigger message.

However, compared with another embodiment as described in FIG. 4 and others, the rights object upgrade request message generated in this step does not have a signature part. In other words, the DRM agent 40 does not generate a digital signature on the message. The signature is generated by the SRM agent 60 in the following step.

The message may include the parameters as illustrated in the following Table 21.

TABLE 21

| Field | Description |
|---|---|
| SRM-ID | An ID of the SRM that is requesting the Rights Object upgrade, instead of an ID of the device. |
| RI-ID | An ID of the RI that has issued the original Rights Object. An ID of the RI for the SRM to request an upgrade. |
| Nonce | A random value generated by the DRM agent. |
| Time | Time when generating a rights object upgrade request. |
| existingRights | An original Rights Object previously issued from the RI, for instance, existingRO, and it is transferred in the form of a protected RO in OMA DRM 2.0. When the protected RO is generated, it is encrypted with a public key of RI, where for the computation of AES-WRAP using REK and MAC key, the DRM agent generates the MAC key, and wraps the REK and the MAC key. The RO is protected in transmission from the DRM agent to the RI because it is being transferred in a protected RO format. |
| ROUpgradeInfo | Information to be added to the existing RO, such as permissions, constraints, etc. |

8) The DRM agent 40 transmits a signature query request message, for instance, Signature Query Request message, to the SRM agent 60 to obtain the signature on the rights object upgrade request message (S452).

The signature query request message includes the rights object upgrade request message. A HMAC included in the rights upgrade request message ensures that the message has not been changed during the transmission from the DRM agent 40 to the SRM agent 60. The HMAC may be generated by using a HMAC algorithm negotiated between the DRM agent 40 and the SRM agent 60. For the HMAC algorithm, HMAC-SHA1-128 may be used.

9) After the SRM agent 60 receives the rights object upgrade request message, the SRM agent 60 verifies the integrity of the rights object upgrade request message, and then signs on the rights object upgrade request message in the meaning of requesting a Rights Object to the RI 20 (S454).

10) The SRM agent 60 transmits a signature query response message, for instance, Signature Query Response message, to the DRM agent 40 to transfer the signature (S456).

The message may include the parameters as illustrated in the following Table 22.

TABLE 22

| Field | Description |
|---|---|
| Status | Includes a processing result to the signature query request. |
| Signature | It may be either only a signature on the rights object upgrade request message, or the rights object upgrade request message with a signature that is signed by the SRM agent signs. |

11) After the DRM agent 40 receives the signature query response message, then the DRM agent 40 transmits a rights object upgrade request message, for instance, Rights Object Upgrade Request message, to the RI 20 to request the upgrade of the right in the SRM 50 (S460).

At this time, the DRM agent 40 may add the signature received from the SRM agent 60 to the rights object upgrade request message to complete the rights object upgrade request message, or may use the rights object upgrade request message received from the SRM agent 60.

The message may include the parameters as illustrated in the following Table 23.

TABLE 23

| Field | Description |
| --- | --- |
| SRM-ID | An ID of the SRM that is requesting the Rights Object upgrade. |
| RI-ID | An ID of the RI that has issued the original Rights Object. An ID of the RI for the SRM to request an upgrade. |
| Nonce | A random value generated by the DRM agent. |
| Time | Time when generating a rights object upgrade request. |
| existingRights | An original Rights Object previously issued from the RI, for instance, existingRO, and it is transferred in the form of a protected RO in OMA DRM 2.0. When the protected RO is generated, it is encrypted with a public key of RI, where for the computation of AES-WRAP using REK and MAC key, the DRM agent generates the MAC key, and wraps the REK and the MAC key. The RO is protected in transmission from the DRM agent to the RI because it is being transferred in a protected RO format. |
| ROUpgradeInfo | Information to be added to the existing RO, such as permissions, constraints, etc. |
| Signature | Signature signed by the SRM agent. |

12) After the RI 20 receives the rights object upgrade request message, the RI 20 checks the existing Rights Object and the ROUpgradeInfo included in the message. The RI 20 checks whether the existingRights Object has been previously issued by itself, and then adds permissions and/or constraints included in the ROUpgradeInfo to the Rights Object.

The RI 20 transfers a rights object upgrade response message, for instance, Rights Object Upgrade Response message, to the DRM agent 40 to transfer a result of the upgrade (S462).

The message may include the parameters as illustrated in the following Table 24.

TABLE 24

| Field | Description |
| --- | --- |
| Status | Includes a processing result to the rights upgrade request. It includes "success" if the processing result is successful, and includes "fail" and a reason code for the failure if the processing result is failed. |
| SRM-ID | An ID of the SRM that is requesting the Rights Object upgrade. Since the ID of the SRM is included instead of an ID of the device, the DRM agent cannot access the upgraded right, but only the SRM agent can use the right. |
| RI-ID | An ID of the RI that has issued the Rights Object. An ID of the RI for the SRM to request an upgrade. |
| Nonce | A random value generated by the DRM agent. |
| Time | Time when generating a rights object upgrade request. |
| existingRO-ID | The Rights Object ID same as the Rights Object previously issued from the RI. |
| protectedRO | An upgraded RO that has been issued from the RI. It may be the form of a protected RO in OMA DRM 2.0, which is protected by using a public key of the SRM agent. |
| Signature | A digital signature signed by the RI on the rights object upgrade response message. |

13) After the DRM agent 40 receives the rights object upgrade response message, the DRM agent 40 verifies the message using the signature in the message. After the verification, the DRM agent 40 retrieves an upgraded Rights Object from the message, and changes it to Rights Information for storing in the SRM 50, and configures to install the right in the SRM agent 60. The detailed description of the configuration may be as follows.

If Rights Information is configured, then the DRM agent 40 measures the size of the Rights Information.

The DRM agent 40 retrieves wrapped key material from protectedRO of the rights object upgrade response message. The wrapped key material is included in a <protectedRO> element::<ro> element::<encKey> element::<xenc:CipherData> element::<xenc:Ciphervalue> element, where the symbol "::" denotes a sub-element. In other words, the <ro> element is located at a lower level of the <protectedRO> element, and the <encKey> element exists at a lower level of the <ro> element.

The DRM agent 40 generates a random value for Handle_3 to distinguish an upgraded right to be installed in the SRM 50.

After the configuration, the DRM agent generates an upgrade setup request message, for instance, Upgrade Setup Request message, to transmit the message to the SRM agent 60 (S470).

The message may include the parameters as illustrated in the following Table 25.

TABLE 25

| Field | Protection Requirement | Description |
| --- | --- | --- |
| Handle_2 | Integrity | Used to identify a right to be upgraded that is stored in SRM. The Handle_2 is 10 bytes, which is a value randomly generated in the DRM agent. The Handle_2 is used to identify the corresponding right among the rights in the SRM to use the associated content. |
| Handle_3 | Integrity and confidentiality | Used to identify an upgraded right to be installed into SRM. The Handle_3 is 10 bytes, which is a value randomly generated in the DRM agent, and used to identify the corresponding right among the rights in the SRM to use the associated content. |
| Size of Rights | Integrity | A size of the upgraded right, indicating a size of the Rights Information of the upgraded right to be installed into the SRM agent. The Rights Information includes Rights MetaData, a Rights Object Container, and the State Information. |
| Wrapped Key Material | Integrity | Includes the wrapped concatenation of a MAC key, $K_{MAC}$ and REK, and $K_{REK}$. Wrapped key material is a value identical to a C-value specified in section 7.2.1 of DRM v2.1 [OMADRMv2.1]. A <protectedRO> element::<ro> element::<encKey> element::<xenc:CipherData> element::<xenc:Ciphervalue> corresponds to a C-value. |

14) After the SRM agent 60 receives the upgrade setup request message, the SRM agent 60 performs a setup operation for installing an upgraded right into the SRM 50 (S472).

First, the SRM agent 60 derives $K_{MAC}$ and $K_{REK}$ values through wrapped key material in the message. The process of the derivation may be specifically as follows.

The SRM agent 60 divides C into $C_1$ and $C_2$, and derives $c_1$ using $C_1$ and OS2IP( ). Then, the SRM agent 60 obtain a value Z by decrypting $c_1$ with a private key of SRM. In other words, the following Equation 1 is used.

$$C_1/C_2 = C$$

$$c_1 = OS2IP(C_1, m\text{Len})$$

$$Z = \text{RSA.DECRYPT}(\text{PrivKeySRM}, c_1) = c^d \bmod m \quad \text{[Equation 1]}$$

where, the C is the wrapped key material. OS2IP( ) is a function for converting an octet string to a non-negative integer, which is defined in [PKCS-1]. RSA.DECRYPT( ) is a decryption function of the RSA encryption method.

As described in the following Equation 2, the SRM agent 60 derives KEK using the value Z and KDF( ).

$$KEK = KDF(I2OSP(Z, mLen), NULL, kekLen) \quad \text{[Equation 2]}$$

As described in the following Equation 3, the SRM agent 60 calculates $K_{MAC}|K_{REK}$ by using the KEK and the $C_2$ as an input of AES-UNWRAP( )

$$KMAC/KREK = AES\text{-}UNWRAP(KEK, C2) \quad \text{[Equation 3]}$$

where, a key transport scheme is illustrated in "http://www.rsasecurity.com/rsalabs/pkcs/schemas/pkcs-1#rsaes-kem-kdf2-kw-aes128."

The SRM agent 60 stores the KREK(REK) among the decrypted KMAC and KREK values. The REK is used to decrypt the encryption CEK transferred through a <rights> element of the RO container included in a right upgrade request message expected to be transmitted from the DRM agent 40.

Next, after the derivation process, the right stored in the SRM 50 may be in a state as illustrated in the following Table 26.

TABLE 26

| Handle | Rights Information | LAID | REK |
|---|---|---|---|

As illustrated in the above Table 26, it is in a state that the handle and the REK are stored in the SRM 50 but the Rights Information and the LAID are not stored therein. In other words, the Handle__3 is used only to reserve for Rights Information to be installed into the SRM 50, and afterwards, the Rights Information transferred via a rights installation request message from the DRM agent 40 will be stored together.

15) After the SRM agent 60 receives the upgrade setup request message, the SRM agent 60 reserves a region for handle included in the message, and transmits an upgrade setup response message, for instance, Upgrade Setup Response message, to the DRM agent 40 (S474).

The upgrade setup response message may include the parameters as illustrated in the following Table 27.

TABLE 27

| Field | Protection Requirement | Description |
|---|---|---|
| Status | Integrity | A processing result of the upgrade setup request message. The specific value is illustrated in the following Table 28. |
| $K_{MAC}$ | Integrity and confidentiality | A MAC key for verifying the integrity of a right issued to the SRM by the RI. The RI can check the integrity of a protected Rights Object transferred from the rights object upgrade response message through the $K_{MAC}$. |

The values of the status may be illustrated in the following Table 28.

TABLE 28

| State Value | Description |
|---|---|
| Success | The upgrade setup request is successfully processed. |
| Field Integrity Verification Failed | A HMAC value of the upgrade setup request message is not identical to a HMAC value generated by the SRM agent. |
| Duplicate Handle | SRM already has a right related to the same handle. |
| Not Enough Space | Not enough storage space as much as corresponding to Size of Rights in SRM. |

TABLE 28-continued

| State Value | Description |
|---|---|
| Parameter Failed | Failed in the structure and length of the upgrade setup request message. |
| Unexpected Request | The upgrade setup request message has been received in the wrong order or was a not-allowed message. |
| Unknown Error | An unknown error occurred |

In the above Table 28, other values except "success" denote that an error has occurred during the processing to the upgrade setup request message.

16) After the DRM agent 40 receives the upgrade setup response message, the DRM agent 40 checks through KMAC included in the message that the protected Rights Object has not been changed while being transmitted from the RI 20 (S476).

Specifically, the DRM agent 40 verifies the MAC value by comparing the calculated MAC on the <protectedRO> element::<mac> element::<ds:SignatureValue> element with the <protectedRO> element::<ro> element.

A HMAC algorithm such as HMAC-SHA-1( ) may be used for the calculation of the MAC, where the HMAC is obtained by taking a value of the <ro> element as a message and KMAC as a MAC key for the HMAC( ) algorithm. The HMAC value is the MAC of one side hash which is used for the comparison.

The verification process as described above may ensure that $K_{MAC}|K_{REK}$ and a <rights> element, included in the <ro> element in the protected Rights Object (RO), have been transferred without any modifications or changes. The DRM agent 40 performs the verification for the protected Rights Object on behalf of the SRM agent 60, and if the verification is successful the DRM agent 40 continues to perform the remaining procedures that follow.

17) Next, the DRM agent 40 transmits a rights upgrade request message, for instance, Rights Upgrade Request message, to the SRM agent 60 to request an upgrade of the Rights Object (S480).

The rights upgrade request message includes the Handle__3 reserved via the upgrade setup request message, and includes LAID and Rights Information. For this purpose, the DRM agent 40 uses Rights Object received from the RI 20 to set up the LAID and the Rights Information that comply with SRM version 1.0 so that the SRM agent 60 can recognize.

The rights upgrade request message may include the parameters as illustrated in the following Table 29.

TABLE 29

| Field | Protection Requirement | Description |
|---|---|---|
| Handle__3 | Integrity and confidentiality | Used to identify an upgraded right to be installed into SRM. The Handle__3 is 10 bytes, which is a value randomly generated in the DRM agent, and used to identify the corresponding right among the rights in the SRM to use the associated content. The use of the associated content includes a Local Rights Consumption where the device with the SRM inserted can renders the content. Same value as a handle received from the DRM agent via the upgrade setup request message. |

TABLE 29-continued

| Field | Protection Requirement | Description |
|---|---|---|
| LAID (List of AssetID) | Integrity | A list of the hashed AssetID associated with the corresponding right. |
| Rights Information | Integrity | Described in the above Table 1. |

18) After the SRM agent 60 receives the rights upgrade request message, the SRM agent 60 stores the handle and the Rights Information within the message into the SRM 50, and updates the handle list (S482). Once the handle list is updated, the updated handle list can be recognized when the SRM 50 is inserted into another device.

After the derivation process, the right stored in the SRM 50 may be in a state as illustrated in the following Table 30.

TABLE 30

| Handle | Rights Information | LAID | REK |
|---|---|---|---|

In other words, it is in a state that all the values of a handle, Rights Information, LAID and REK are stored in the SRM 50.

19) Next, completing the update, the SRM agent transmits a result of the rights upgrade through a rights upgrade response message, for instance, Rights Upgrade Response message, to the DRM agent 40 (S484).

The message may include the parameters as illustrated in the following Table 31.

TABLE 31

| Field | Protection Requirement | Description |
|---|---|---|
| Status | Integrity | A processing result of the rights upgrade message. The specific value is illustrated in the following Table 32. |

The values of the status may be illustrated in the following Table 32.

TABLE 32

| State Value | Description |
|---|---|
| Success | The rights upgrade request is successfully processed. |
| Field Integrity Verification Failed | A HMAC value of the rights upgrade request message is not identical to a HMAC value generated by the SRM agent. |
| Handle Not Found | A handle included in the rights upgrade request cannot be found in SRM. |
| Handle In-Consistent | A handle included in the rights upgrade request is different from a handle that has been included in the upgrade setup request. |
| Not Enough Space | Not enough storage space as much as corresponding to Size of Rights in SRM. |
| Parameter Failed | Failed in the structure and length of the upgrade setup request message. |
| Unexpected Request | The upgrade setup request message has been received in the wrong order or was a not-allowed message. |
| Unknown Error | An unknown error occurred. |

In the above Table 32, other values except "success" denote that an error has occurred during the processing to the upgrade setup request message.

20) After the DRM agent 40 receives the rights upgrade response message, then the DRM agent 40 deletes the copy of the upgraded Rights Object in the DRM agent 40 (S486). The DRM agent 40 may disable the copy of the upgraded Rights Object rather than deleting it, and if the copy of the upgraded Rights Object is required to be enabled later, the DRM agent 40 may hold it in a disabled state, otherwise may delete the copy.

The method according to the present invention as described above may be implemented by software, hardware, or a combination of both. For example, the method according to the present invention may be stored in a storage medium (e.g., internal memory, flash memory, hard disk, and the like, in a mobile terminal), and may be implemented through codes or instructions in a software program that can be implemented by a processor (for example, microprocessor in a mobile terminal). Hereinafter, it will be described with reference to FIG. 8.

Figure 8:
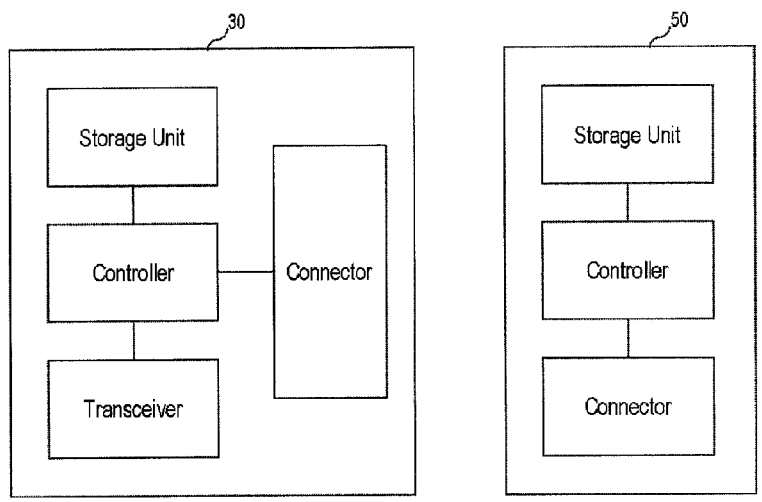
FIG. 8 is a block diagram of a terminal and SRM.

FIG. 8 is a configuration block diagram illustrating a terminal 30 and a SRM 50 according to the present invention.

As illustrated in FIG. 8, the terminal 30 may include a storage unit, a transceiver, a connector, and a controller. Furthermore, the memory card, i.e., SRM 50, may include a storage unit, a connector, and a controller.

The connector connects the terminal 30 and the memory card, i.e., SRM 50, with each other.

The storage units store the foregoing method as illustrated in FIGS. 4 through 7. Also, the storage units store information within each of the received messages.

Each of the controllers controls the storage units and the transceivers, respectively. Specifically, the controllers implement the foregoing methods, respectively, stored in each of the storage units. Furthermore, each of the controllers transmits the foregoing signals through the transceivers.

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

The invention claimed is:

1. A method for upgrading a rights object installed in a removable media, the method comprising:
    receiving, from a Rights Issuer, an upgrade trigger message including a rights object identifier, and an asset identifier, wherein the rights object identifier is related to a rights object to be upgraded, and the asset identifier identifies contents associated with the rights object;
    transmitting, to the removable media, a rights information request message including the asset identifier;
    receiving, from the removable media, a rights information message including rights information associated with the contents identified by the asset identifier and a first identifier of the rights information,
    wherein the rights information request message further includes a length of the rights information that can be included in the rights information message, the rights information message is received one or more times, and the rights information message further includes a flag indicating whether or not subsequent rights information messages follow;

checking whether the right information included in the rights information message corresponds to the rights object identifier included in the upgrade trigger message; and performing an encryption key retrieval procedure, wherein the encryption key retrieval procedure comprises:

transmitting, to the removable media, an upgrade information request message including the first identifier of the rights information and a newly generated second identifier;

receiving, from the removable media, an upgrade information message including an encryption key for the rights information corresponding to the first identifier; and performing a rights upgrade procedure based on the rights information and the encryption key.

2. The method of claim 1, wherein if the rights information message comprises a plurality of the rights information and a plurality of identifiers associated with the asset identifier, the encryption key retrieval procedure is performed respectively for at least one of the rights information, and wherein the checking further includes checking whether the plurality of the rights information included in the rights information message corresponds to the rights object identifier included in the upgrade trigger message, respectively.

3. The method of claim 1, wherein the rights information request message is a "RightsInfoListQueryRequest" message and the rights information message is a "RightsInfoListQueryResponse" message.

4. The method of claim 1, wherein the upgrade information request message is a "UpgradeRightsRetrievalRequest" message and the upgrade information message is a "UpgradeRightsRetrievalResponse" message.

5. The method of claim 1, wherein the upgrade trigger message further includes a flag indicating that a rights object corresponding to the rights object identifier is stored in the removable media.

6. The method of claim 1, wherein the rights upgrade procedure comprises:

transmitting to the Rights Issuer the rights object, rights object upgrade information, and a signature signed by a terminal;

acquiring an upgraded rights object from the Rights Issuer;

generating an LAID (a list of hashed asset identifiers), an encryption key of the upgraded rights object, and rights information of the upgraded rights object based on the upgraded rights object; and transmitting the identifier of the rights object, an identifier of the upgraded rights object, the LAID, the encryption key of the upgraded rights object, and the rights information of the upgraded rights object to the removable media for installation of the upgraded rights object; and acquiring a result of an upgrade of the rights object from the removable media.

7. The method of claim 6, wherein the rights object and the upgraded rights object are protected using a public key of the terminal.

8. The method of claim 1, wherein the rights upgrade procedure comprises:

transmitting a rights object upgrade request message including the rights object, rights object upgrade information, and a signature to the Rights Issuer for upgrade of the rights object, wherein the signature is a digital signature on the rights object upgrade request message signed by the removable media;

acquiring an upgraded rights object from the Rights Issuer, wherein the upgraded rights object is a protected rights object;

verifying the upgraded rights object; generating an LAID and rights information of the upgraded rights object based on the upgraded rights object; and transmitting an identifier of the upgraded rights object and the rights information of the upgraded rights object to the removable media for installation of the upgraded rights object.

9. A terminal of upgrading a rights object installed in a removable media, comprising:

a transceiver configured to:

receive an upgrade trigger message including a rights object identifier and asset identifier from a Rights Issuer, wherein the rights object identifier is related to a rights object to be upgraded, and the asset identifier identifies contents associated with the rights object;

transmit a rights information request message including the asset identifier;

receive a rights information message including rights information associated with the contents identified by the asset identifier and a first identifier of the rights information, wherein the rights information request message further includes a length of the rights information that can be included in the rights information message, the rights information message is received one or more times, and the rights information message further includes a flag indicating whether or not subsequent rights information messages follow;

transmit an upgrade information request message including the first identifier of the rights information and a newly generated second identifier; and receive an upgrade information message including an encryption key for the rights information corresponding to the first identifier; and a processor configured to:

check whether the rights information included in the rights information message corresponds to the rights object identifier, included in the upgrade trigger message;

perform an encryption key retrieval; and perform a rights upgrade based on the rights information and the encryption key.

* * * * *